(12) United States Patent
Morrow et al.

(10) Patent No.: US 7,419,021 B2
(45) Date of Patent: Sep. 2, 2008

(54) ENGINE AND GENERATOR ORIENTATION WITHIN A HYBRID VEHICLE

(75) Inventors: Jon J. Morrow, Neenah, WI (US); Gary W. Schmiedel, Oshkosh, WI (US); David Steinberger, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 288 days.

(21) Appl. No.: 10/951,257

(22) Filed: Sep. 27, 2004

(65) Prior Publication Data

US 2006/0065453 A1    Mar. 30, 2006

(51) Int. Cl.
*B60K 6/02*    (2006.01)
(52) U.S. Cl. .............. 180/65.2; 180/291; 296/190.08; 903/951
(58) Field of Classification Search ............ 296/190.01, 296/190.04, 190.05, 190.08; 180/311, 312, 180/291, 65.2, 65.3; 903/951
See application file for complete search history.

(56) References Cited

U.S. PATENT DOCUMENTS

| | | | | |
|---|---|---|---|---|
| 1,979,191 A | * | 10/1934 | Burney | 180/68.1 |
| 2,720,931 A | * | 10/1955 | Thannhauser | 180/298 |
| 3,288,237 A | * | 11/1966 | Muller | 180/68.1 |
| 3,774,710 A | * | 11/1973 | Gustavsson | 180/68.1 |
| 3,827,523 A | * | 8/1974 | Williams | 165/44 |
| 3,929,202 A | * | 12/1975 | Hobbensiefken | 180/68.4 |
| 4,345,641 A | | 8/1982 | Hauser | |
| 5,147,003 A | * | 9/1992 | De Monclin | 180/14.2 |
| 5,673,767 A | * | 10/1997 | Uno et al. | 180/89.12 |
| 6,022,048 A | * | 2/2000 | Harshbarger et al. | 280/781 |
| 6,105,698 A | * | 8/2000 | Tsuyama et al. | 180/89.1 |
| 6,429,541 B2 | | 8/2002 | Takenaka et al. | |
| 6,494,285 B1 | * | 12/2002 | Williams | 180/291 |
| 6,522,105 B2 | | 2/2003 | Kodama et al. | |
| 6,653,817 B2 | | 11/2003 | Tate, Jr. et al. | |
| 6,661,109 B2 | | 12/2003 | Fukasaku et al. | |
| 6,678,972 B2 | | 1/2004 | Naruse et al. | |
| 6,757,597 B2 | | 6/2004 | Yakes et al. | |
| 6,757,598 B2 | | 6/2004 | Okoshi | |

(Continued)

FOREIGN PATENT DOCUMENTS

EP    0 352 323 A1    1/1990

(Continued)

OTHER PUBLICATIONS

International Search Report and Written Opinion for Application No. PCT/US2005/034803, date of mailing Feb. 6, 2006, 11 pages.

*Primary Examiner*—Christopher P. Ellis
*Assistant Examiner*—John D Walters
(74) *Attorney, Agent, or Firm*—Foley & Lardner LLP

(57) ABSTRACT

A vehicle powered by a hybrid drive system configured to improve ergonomics within an operator compartment, minimize engine noise within the operator compartment, and/or reduce the transmission of heat associated with the drive system into the operator compartment is disclosed. The operator compartment is carried and/or supported on a chassis relative to the hybrid drive system. The hybrid drive system is coupled to the chassis and comprises an engine coupled to a generator portion. When coupled to the chassis, the generator is positioned in front of the engine. In one embodiment, the vehicle is a refuse vehicle.

40 Claims, 5 Drawing Sheets

U.S. PATENT DOCUMENTS

| | | | |
|---|---|---|---|
| 6,782,965 B2 * | 8/2004 | Sztykiel et al. | 180/292 |
| 6,793,028 B2 * | 9/2004 | Pack | 180/68.1 |
| 6,948,768 B2 * | 9/2005 | Corcoran et al. | 296/190.08 |
| 2002/0103580 A1 | 8/2002 | Yakes et al. | |
| 2003/0205422 A1 | 11/2003 | Morrow et al. | |

FOREIGN PATENT DOCUMENTS

| | | |
|---|---|---|
| EP | 0 444 467 A1 | 9/1991 |
| EP | 1 069 310 A2 | 1/2001 |
| EP | 1 391 370 A1 | 2/2004 |

* cited by examiner

ENGINE AND GENERATOR ORIENTATION WITHIN A HYBRID VEHICLE

FIELD

The present invention relates generally to the field of hybrid vehicles (i.e., a vehicle having a drive system that includes more than one power source). More particularly, the present invention relates to the drive systems utilized by hybrid vehicles, namely drive systems comprising an engine and a generator. The present invention further relates to refuse vehicles employing hybrid drive systems comprising an engine and a generator.

BACKGROUND

Work vehicles such as refuse vehicles, firefighting vehicles, military vehicles, or various material handling vehicles typically necessitate an operator or another occupant of the vehicle to move in and out an operator compartment of the vehicle. For example, a refuse vehicle collecting refuse in a residential area makes frequent stops to collect refuse. Often, the operator must exit the vehicle at each stop to cause the refuse to be loaded into the vehicle.

To improve efficiency, manufacturers have sought to move the operator compartment closer to the ground to reduce the distance an operator must move when exiting and entering the vehicle. Lowering the operator compartment, without requiring an oversized console or "doghouse," is often limited by the conventional internal combustion engines, transmissions, and drive trains typically employed in such vehicles. An oversized console may interfere with desired movements of an operator and/or may interfere with an operator's line of sight throughout the vehicle.

Work vehicles employing conventional internal combustion engines, transmissions, and drive trains often experience a substantial amount of engine noise within the operator compartment. Engine noise within the operator compartment is enhanced because the operator compartment is often positioned substantially over the engine and/or slightly behind the engine. Further, such vehicles often exhibit relatively low fuel efficiency and/or produce undesirable emissions that are released during operation.

Accordingly, it would be desirable to provide a vehicle which overcomes one or more of the above-mentioned problems. Advantageously, such a vehicle would enhance many aspects of refuse collection and transportation, and/or other vehicle applications. The techniques below extend to those embodiments which fall within the scope of the appended claims, regardless of whether they provide any of the above-mentioned advantageous features.

SUMMARY

According to one exemplary embodiment, a hybrid vehicle includes a vehicle chassis, an operator compartment supported at the forward portion of the vehicle chassis, and a drive system comprising the combination of an engine coupled inline with a generator. The drive system is positioned substantially under the operator compartment. The generator is positioned in front of the engine relative to the vehicle chassis and coupled to at least one electric drive motor powering a wheel of the vehicle.

According to a second exemplary embodiment, a refuse vehicle includes a chassis configured to support a refuse container, and a drive system comprising the combination of an engine coupled to a generator. The drive system is supported at a front portion of the chassis. The refuse vehicle further includes an operator compartment at least partially supported over the drive system. The generator is positioned in front of the engine and coupled to at least one electric drive motor powering a wheel of the refuse vehicle.

According to another exemplary embodiment, a hybrid drive system for use in a vehicle includes an engine coupled inline with a generator. The combination of the engine and generator is configured to be supported by a vehicle chassis at least partially under an operator compartment of the vehicle. The generator is configured to be positioned in front of the engine relative to the vehicle chassis.

According to another exemplary embodiment, a method of manufacturing a hybrid vehicle includes the steps of providing a chassis configured to movably support a plurality of wheels, providing a drive system comprising an engine coupled to a generator, coupling the drive system to the chassis at an orientation that positions the generator in front of the engine, and supporting an operator compartment at a forward position along the chassis. The operator compartment is substantially disposed over the generator. The method of manufacturing further comprises the step of coupling the generator to at least one electric drive motor powering a wheel of the vehicle.

DETAILED DESCRIPTION

Figure 1:
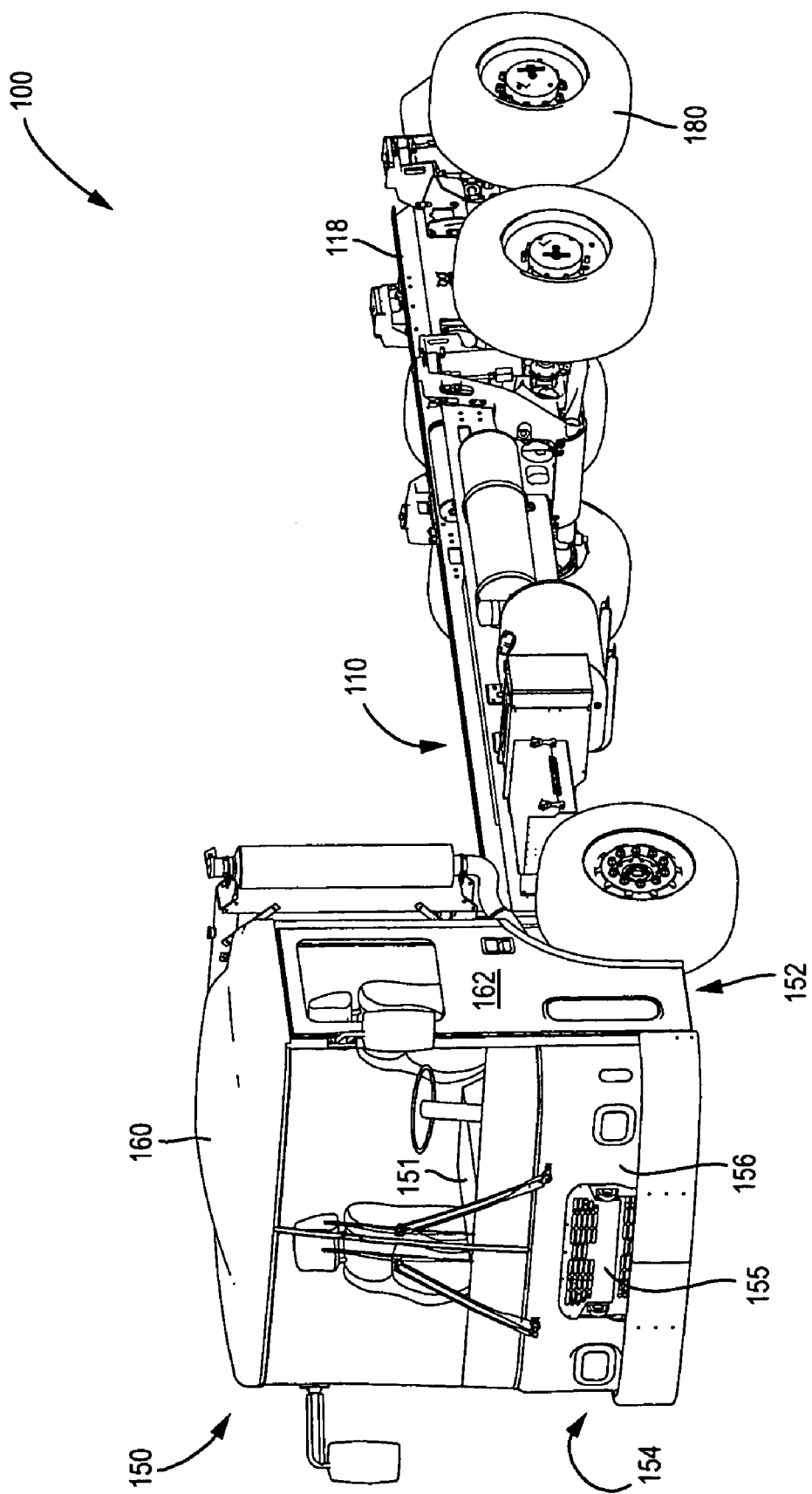
FIG. 1 is a perspective view of a refuse vehicle having a hybrid drive system according to an exemplary embodiment.

Referring to FIGS. 1 through 5, a vehicle system and components thereof are shown according to exemplary embodiments. Shown in FIG. 1 is one embodiment of a refuse vehicle 100. Refuse vehicle 100 includes a hybrid drive system 200 (shown more clearly in FIGS. 2 and 3) supported at an orientation and/or position relative to a chassis 110 intended to improve ergonomics within an operator compartment 150, reduce engine noise within the operator compartment, and/or minimize the transmission of heat into the operator compartment. Hybrid drive system 200 generally comprises an engine 202 and a generator 204. Generator 204 is coupled to engine 202 and constitutes the portion of drive system 200 located substantially under operator compartment 150. According to an exemplary embodiment, generator 204 is coupled to engine 202 with generator 204 being positioned in front of engine 202.

It should be noted at the outset that for purposes of this disclosure, the term "hybrid," whether used alone, or in combination with terms such as "vehicle" and/or "drive system," is used generally to refer a vehicle having a drive system that includes more than one power source. According to an exemplary embodiment, refuse vehicle 100 utilizes an internal combustion engine and at least one electric drive motor (e.g., an electric traction motor, etc.). A generator is coupled to the engine for converting the mechanical energy (e.g., rotational movement, etc.) provided by the internal combustion engine into the electrical energy needed to power an electric drive motor. As can be appreciated, the internal combustion engine and/or the electric drive motor and control systems thereof may be replaced by a variety of known or otherwise suitable power sources.

According to an exemplary embodiment, a generator is electrically coupled to at least one electric drive motor and a corresponding control system. An electrical bus assembly, such as an AC electrical bus, provides an electrical power transmission link between generator, the corresponding control system, and the electric drive motor. An example an AC electrical bus assembly is disclosed in U.S. Pat. No. 6,757,597, which is incorporated herein by reference in its entirety. According to an exemplary embodiment, two electrical buses are provided, a relatively high voltage electrical bus and a relatively low voltage electrical bus. A high voltage electrical bus provides a power transmission link for the electric drive motors, while a low voltage electrical bus provides a power transmission link for auxiliary systems such as the vehicle's cooling system. It should be noted that the generator may be coupled to any of a variety of generally known or otherwise suitable electric drive systems and corresponding control systems.

It should also be understood that FIG. 1 merely illustrates one embodiment, and refuse vehicle 100 may include a variety of configurations. For example, refuse vehicle 100 may be configured as a rear loading refuse vehicle, front loader, side loader, bucket loader, automated side loader, etc. The applicability of the present disclosure does not depend on the exact configuration, construction, size, or assembly of refuse vehicle 100. It should further be noted that the teachings herein extend beyond refuse vehicles and apply to a variety of vehicles including material handling vehicles, firefighting vehicles, cargo trucks, military vehicles, concrete mixing vehicles, buses, and any other vehicle employing a hybrid drive system where it would be beneficial to carry the generator forward of the engine.

With reference to FIG. 1, refuse vehicle 100 is designed to receive a receptacle or container (not shown) wherein refuse (e.g., garbage, waste, trash, recyclables, yard waste, hazardous materials, or the like) can be collect and retained during operation. Depending on the application and configuration of refuse vehicle 100, the container may be movably coupled relative to the vehicle, detachably coupled, or fixedly coupled. Once the container is full, it can be emptied at a suitable location or facility. The container can be emptied in a variety of ways. Two conventional methods for emptying the container are gravity dumping and ejecting the refuse using a packer.

Figure 2:
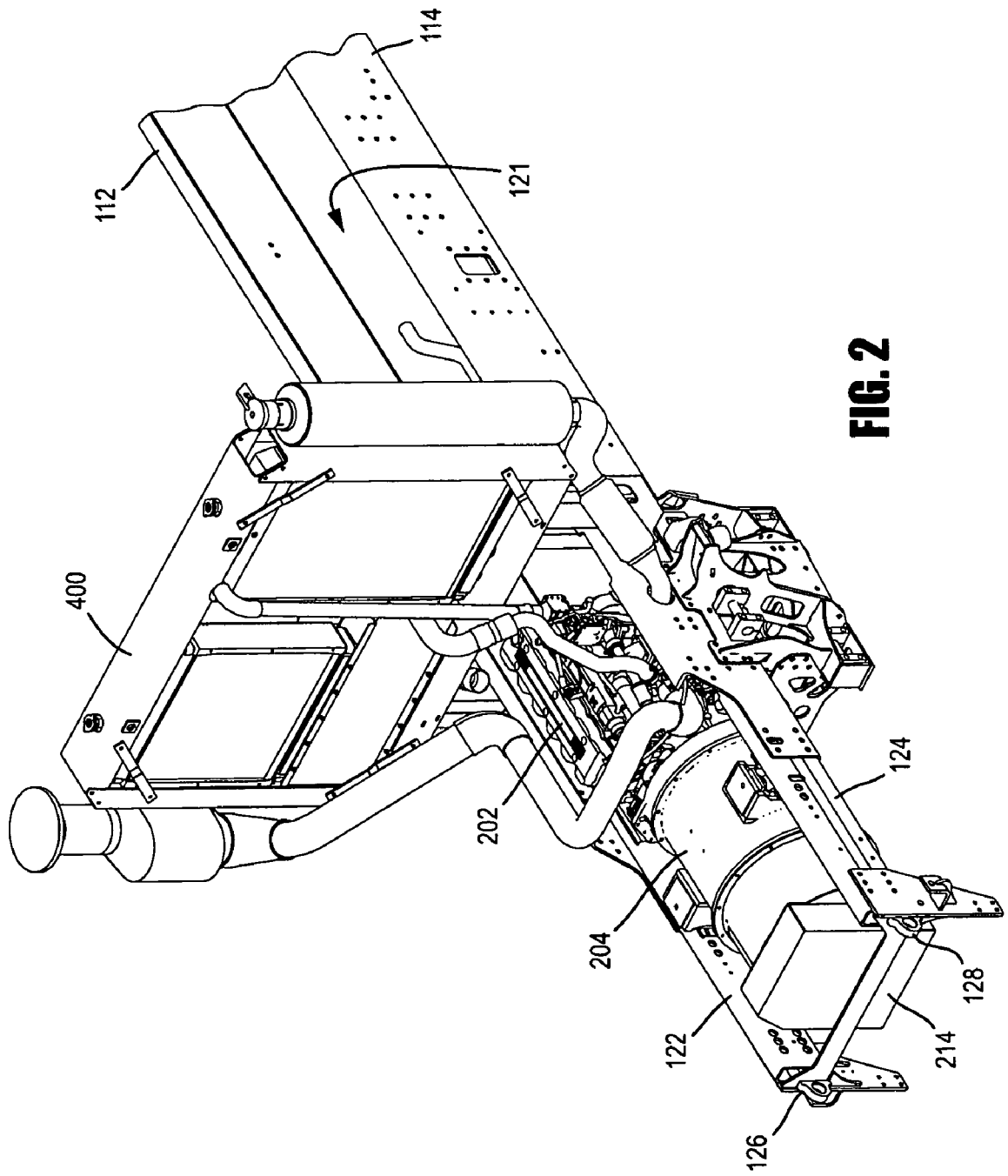
FIG. 2 is a partial perspective view of a chassis for the vehicle shown in FIG. 1.

Referring to FIGS. 1 and 2, refuse vehicle 100 includes a platform or chassis 110 functioning as a support structure for the components of the refuse vehicle and is typically in the form of a frame assembly. According to an exemplary embodiment, chassis 110 generally includes a first frame member 112 and a second frame member 114. First frame member 112 and second frame member 114 are arranged as two generally parallel chassis rails extending in a fore and aft direction between a first end 116 (a forward portion of the vehicle) and a second end 118 (a rearward portion of the vehicle). First frame member 112 and second frame member 114 are configured as elongated structural or supportive members (e.g., a beam, channel, tubing, extrusion, etc.). For example, according to an exemplary embodiment, first frame member 112 and second frame member 114 are elongated "C-channel" members with the open portion of the "C" facing the opposing frame member. First frame member 112 and second frame member 114 are spaced apart a distance 120 and define a void or cavity 121. Cavity 121, which generally constitutes the centerline of the vehicle, may provide an area for effectively concealing or otherwise mounting certain vehicle components.

Figure 3:
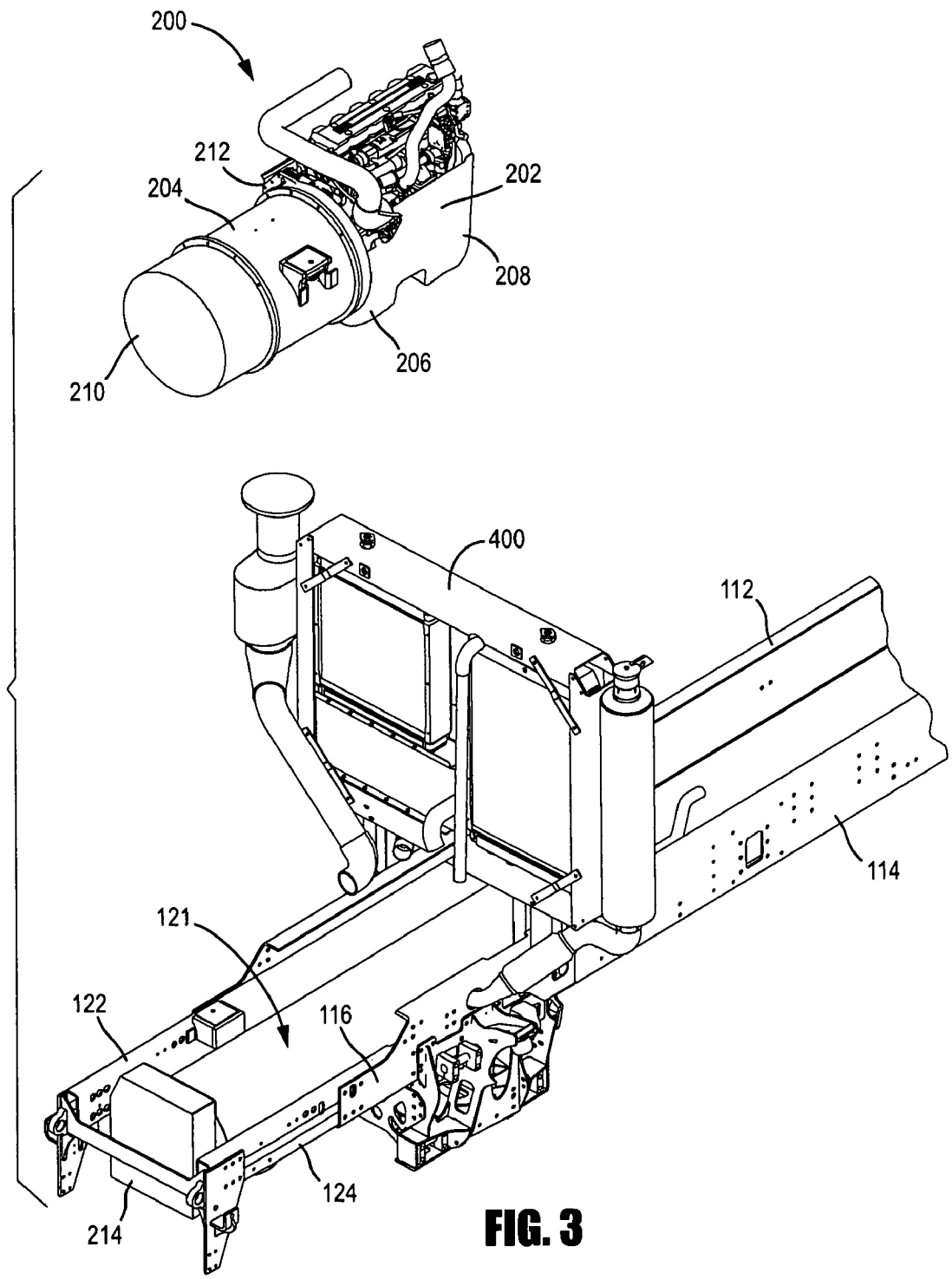
FIG. 3 is a partial exploded view of the hybrid drive system coupled to the chassis in FIG. 2.

Referring particularly to FIGS. 2 and 3, chassis 110 is further shown to include a pair of members, shown as a first extension 122 and a second extension 124, extending from first ends 116 of first frame member 112 and second frame member 114. First extension 122 and second extension 124 are configured as additional structural or supportive members (e.g., a beam, channel, tubing, extrusion, etc.). According to an exemplary embodiment, first extension 122 and second extension 124 are elongated tubular members fixedly coupled to first frame member 112 and second frame member 114 respectively, and having a generally rectangular cross-section. As can be appreciated, the extension members may be coupled to the frame members using any of a variety of suitable techniques (e.g., welding, mechanical fasteners, etc.), or alternatively, may be integrally formed with the frame members.

First extension 122 and second extension 124 may provide a structural component that allows refuse vehicle 100 to lift, tow, and/or pull a container or any other object from the front of the vehicle, or alternatively, may allow refuse vehicle 100 itself to be lifted and/or towed from the front of the vehicle. As shown in FIG. 2, a pair of mounting structures 126, 128 may be coupled to first extension 122 and second extension 124 for facilitating the lift, tow, and/or pull capabilities of refuse vehicle 100. First extension 122 and second extension 124 may also provide a structure configured to at least partially support a portion of drive system 200. According to an exemplary embodiment, generator 204 is coupled to at least one of the first and second extension members.

Figure 4:
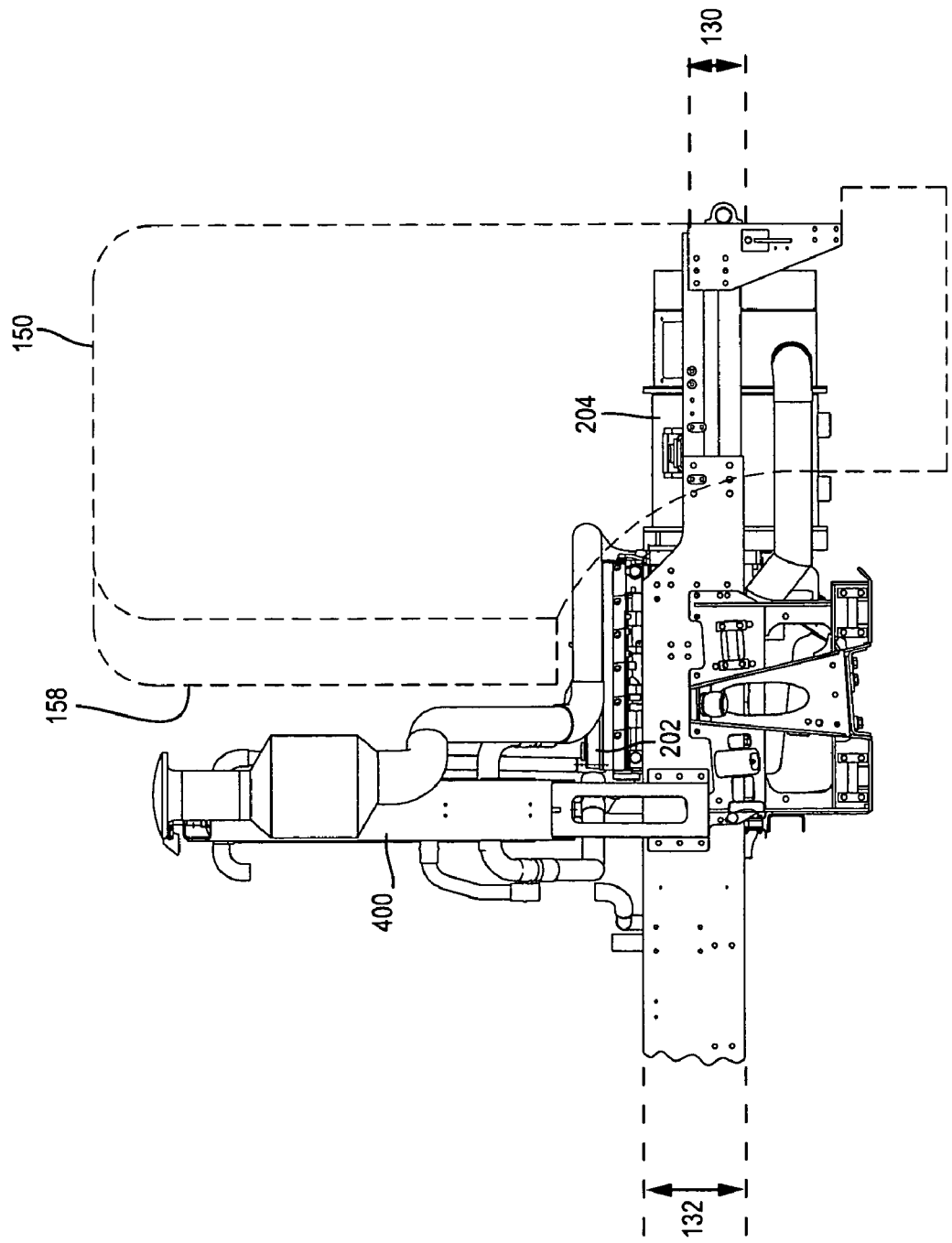
FIG. 4 is a side plan view of the chassis shown in FIG. 2, showing the positioning of an operator compartment in dashed lines.

Referring to FIG. 4, the configuration of first extension 122 and second extension 124 is intended to improve ergonomics within occupant compartment 150 by allowing the internal volume of occupant compartment 150 (particularly the front lower area in the centerline of the vehicle) to be increased. As shown, first extension 122 and second extension 124 have a height 130 that is less than a height 132 of frame member 112 and second frame member 114. The increased height of first frame member 112 and second frame member 114 is provided to support engine 202 and/or other components of refuse vehicle 100. Reducing the height of first extension 122 and second extension 124 allows the height and/or size of a console (e.g., doghouse, hump, etc.) located in a front portion of the vehicle to be reduced thereby allowing occupant compartment 150 to be lowered. Typically, the console closely follows or conforms to the profile of chassis 110 and/or components mounted thereto when practically possible to maximize the available space within operator compartment 150. As detailed below, the differentiation in height is possible because of the positioning of drive system 200 along chassis 110 (e.g., positioning generator 204 in front of engine 202, etc.).

Referring again to FIG. 1, a plurality of drive wheels 180 are rotatably coupled to chassis 110. The number and/or configuration of wheels 180 may vary depending on the embodiment. According to an exemplary embodiment, refuse vehicle 100 utilizes six wheels 180 (two tandem wheel sets at the rear of the vehicle and one wheel set in the front). In this configuration, the wheel set in the front is steerable while the two tandem wheel sets at the rear are configured to be driven by a drive apparatus. As can be appreciated, refuse vehicle 100 may have any number of wheel configurations including, but not limited to, four or eight wheels.

In one embodiment, the drive apparatus may be in the form of at least one electric drive motor (not shown). According to an exemplary embodiment, an electric drive motor is operably coupled to each axle coupling wheels 180 of the two rear wheel sets. In such an embodiment, refuse vehicle 100 employs two electric drive motors for driving wheels 180 (i.e., one drive motor per each rear axle). As can be appreciated, any of wheels 180 may be steerable and/or driven, and suitable drive apparatuses other than an electric drive motor may be employed.

Still referring to FIG. 1, refuse vehicle 100 includes a vehicle body supported by chassis 110 that includes an enclosure or area capable of receiving a human operator, shown as operator compartment 150. Operator compartment may be configured to receive one or more passengers in addition to the operator. According to an exemplary embodiment, operator compartment 150 is defined by a first side 152, a second side 154, a front portion 156, a rear portion 158, and a platform or roof 160. An access opening 162 can be provided in either, or both, of first side 152 or second side 154 providing a means for ingress and egress. Operator compartment 150 further includes controls associated with the manipulation of chassis 110 (e.g., steering controls, throttle controls, etc.) and optionally includes controls associated with the loading, unloading, and/or compacting of refuse.

FIG. 4 is a partial side view of refuse vehicle 100 illustrating operator compartment 150 in dashed lines. Operator compartment 150 is carried and/or supported at forward position along chassis 110. Positioning operator compartment 150 at the most forward position along chassis 110, and minimizing the size of the operator compartment in the fore and aft direction, allows the container or payload capacity of the vehicle to be maximized. According to an exemplary embodiment, operator compartment 150 is designed to be relatively low to the ground to allow an operator (and/or a passenger) to conveniently enter and exit the vehicle. Such a configuration is particularly suitable for refuse vehicles used in residential settings (e.g., a door-to-door situation, etc.) or any other setting wherein an operator routinely enters and exits operator compartment 150.

Referring again to FIG. 1, operator compartment 150 may be configured so that an operator can operate refuse vehicle 100 from either side of the operator compartment. Operator compartment 150 may also be configured to provide for a steering wheel operable on each side of the occupant compartment. According to various embodiments, operator compartment 150 may be configured as a conventional vehicle (a vehicle in which an operator is seated while driving); or alternatively, may be arranged so that an operator can stand in the operator compartment while driving. If the later configuration is employed, operator compartment 150 may further include a fixed or movable seat for the operator to use when driving longer distances between stops.

According to an exemplary embodiment, operator compartment 150 is movably coupled to chassis 110 to provide access to drive system 200 and/or other vehicle components positioned under the operator compartment. In one embodiment, front portion 156 of operator compartment 150 is pivotally coupled to chassis 110 and configured to move between a first or use position (shown in FIG. 1) and a second or service position (not shown). In the service position, operator compartment 150 is pivoted forward to allow access to drive system 200. The positioning of drive system 200 relative to chassis 110 provides improved access to engine 202 over traditional refuse vehicles. Improved access is obtained since engine 202 is supported further back on chassis 110 than the engines of traditional refuse vehicles.

According to an exemplary embodiment, operator compartment 150 includes a console 151 (the top of which is shown in FIG. 1), often referred to as a "doghouse," extending in a fore and aft direction along the centerline of refuse vehicle 100. The function of console 151 is to at least partially cover and conceal a portion of drive system 200 and/or chassis 110. The size of console 151 within operator compartment 150 is preferably minimized to provide additional space and/or clearance with the operator compartment. In traditional refuse vehicles, the height of the console maybe be relatively high (e.g., shoulder high, etc.) since it must cover a conventional engine, cooling system, transmission, and drive train. In refuse vehicle 100, the configuration and/or orientation of drive system 200 (e.g., positioning generator 204 in front of engine 202, etc.) advantageously allows the size of console 151 to be reduced in comparison to traditional refuse vehicles.

FIGS. 2 through 4, illustrates refuse vehicle 100 wherein operator compartment 150 has been removed to illustrate hybrid drive system 200. Hybrid drive system 200 is supported along chassis 110 and generally includes a prime mover or engine 202 coupled to a generator 204. For purposes of this disclosure, the term "coupled" means the joining or combining of two members directly or indirectly to one another. Such joining or combining may be stationary in nature or movable in nature. Such joining may be achieved with the two members or the two members and any additional intermediate members being integrally formed as a single unitary body with one another or with the two members or the two members and any additional intermediate member being attached to one another. Such joining or combining may be permanent in nature or alternatively may be removable or releasable in nature.

Engine 202 may be a gas turbine engine, an internal combustion engine, such as a diesel or gasoline engine, or the like. Preferably, engine 202 is a diesel internal combustion engine optimized for operation at a constant speed (revolutions per minute). Operating the diesel engine at a constant, optimal speed eliminates inefficiencies associated with changing RPM levels during acceleration and deceleration, improves overall efficiency, and reduces emissions. Engine 202 converts a fuel source (e.g., diesel fuel, gasoline, etc.) to mechanical energy (e.g., rotational movement, etc.) to drive generator 204 which in turn coverts the mechanical energy to electrical energy needed to drive the drive apparatus (e.g., one or more electric drive motors, etc.).

Figure 5:
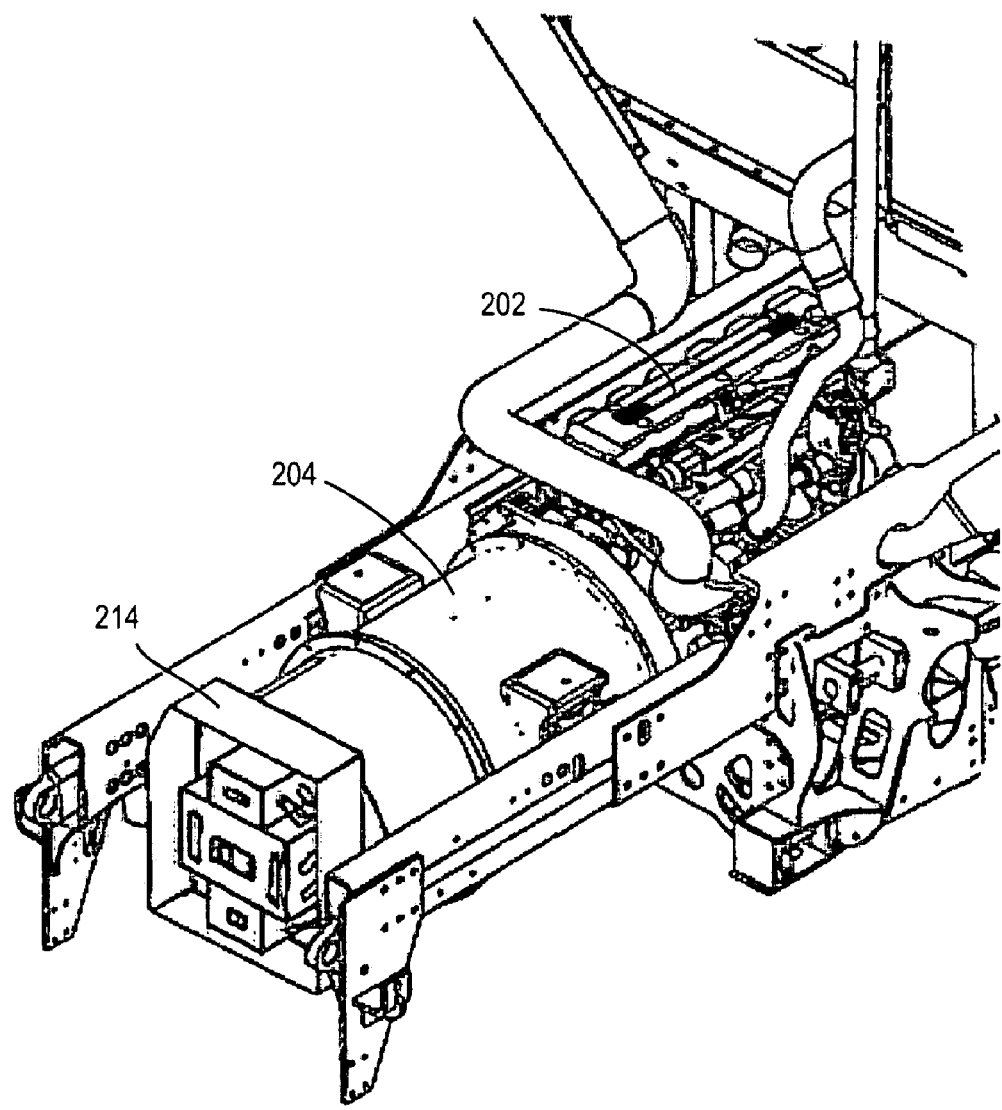
FIG. 5 is a partial perspective view of the chassis shown in FIG. 2, showing a circuit protection system positioned in front of a generator.

Engine 202 includes a first or front portion 206 and a second or rear portion 208. Similarly, generator 204 includes a first or front portion 210 and a second or rear portion 212. According to an exemplary embodiment, rear portion 212 of generator 204 is coupled to front portion 206 of engine 202, while front portion 210 of generator 204 is positioned at the front of refuse vehicle 100. In one embodiment, a control box or panel 214 is coupled to front portion 210 of generator 204. According to an exemplary embodiment, control panel 214 functions as a housing for a circuit protection system (e.g., circuit breakers coupled to the leads exiting generator 204). FIG. 5 illustrates control panel 214 in an open position thereby revealing the circuit protection system housed therein. Positioning control panel 214 at front portion 210 of generator 204 allows the panel (and the components therein) to be conveniently accessed through a missing portion or grill 155 disposed in front portion 156 of operator compartment 150. In addition, the placement of control panel 214 may improve the routing of the leads exiting generator 204 by allowing the leads to be coupled to a circuit protection system before being routed throughout the vehicle.

Referring particularly to FIG. 2, drive system 200 is supported at a forward position along chassis 110 that is generally under operator compartment 150. According to an exemplary embodiment, cavity 121 (defined by first frame member 112 and second frame member 114) is adapted to receive drive system 200. Drive system 200 may be directly coupled to chassis 110, or may be coupled to chassis 110 using a mounting system (e.g., hangers, brackets, braces, supports, etc.).

In one embodiment, engine 202 is coupled to first frame member 112 and second frame member 114 of chassis 110. Generator 204 may also be coupled to first frame member 112 and second frame member 114, and/or may be coupled to first extension 122 and second extension 124. With reference to FIG. 4, generator 204 constitutes the portion of drive system 200 that is substantially under operator compartment 150. In one embodiment, the portion of operator compartment 150 that is positioned over generator 204 can be described approximately as the area in front of a plane formed by the vehicle seat backs. The orientation (e.g., positioning, alignment, etc.) of drive system 200 in refuse vehicle 100 (e.g., the positioning of generator 204 in front of engine 202, etc.) may advantageously improve ergonomics within operator compartment 150, reduce engine noise within the operator compartment, and/or minimize the transmission of heat into the operator compartment.

Referring to FIG. 3, the cross sectional area of engine 202 is generally greater than the cross sectional area of generator 204. With reference to FIG. 4, engine 202 and generator 204 are aligned so that the clearance between the ground and each component is substantially similar. In such a configuration the height of engine 202 above chassis 110 is greater than that of generator 204. By positioning generator 204 in front of engine 202, ergonomics within operator compartment 150 may be improved since the size of a console needed to cover drive system 200 can be minimized near the front of operator compartment 150. Reducing the size of the console may provide for additional clearance for an operator (e.g., hip room, elbow room, etc.) and/or improve an operator's line of sight throughout the occupant compartment.

Refuse vehicle 100 is configured to minimize noise associated with the operation of engine 202 within operator compartment 150 by positioning generator 204 in front of engine 204 and configuring the occupant compartment to be supported substantially over generator 204 rather than engine 202. As can be appreciated, the noise associated with the operation of engine 202 is relatively high in comparison to the noise of generator 204. In traditional refuse vehicles, engine noise is often directly heard by an operator within an operator compartment since the operator compartment typically mounted on top of or slightly behind the engine. In contrast, refuse vehicle 100 can provide reduced engine noise within operator compartment 150 by positioning engine 202 substantially behind the area in which an operator is seated or otherwise positioned. In a traditional refuse vehicle, this space is often occupied by a transmission and/or drive train.

Refuse vehicle 100 may further be configured to reduce the transmission of heat from drive system 200 into occupant compartment 150. As can be appreciated, operation of engine 202 over an extended period of time generates a substantial amount of heat. In a traditional refuse vehicle, such heat is likely to enter the operator compartment since the operator compartment typically mounted on top of or slightly behind the engine. In contrast, refuse vehicle 100 can minimize the transmission of heat into operator compartment 150 by positioning engine 202 substantially behind the area in which an operator is seated or otherwise positioned. Heat transmission is further reduced by positioning a cooling package 400 (e.g., radiator, etc.) used to cool drive system 200 behind operator compartment 150.

It is important to note that the construction and arrangement of the elements of the vehicle and the hybrid drive system as shown in the illustrated embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, or the length or width of the structures and/or members or connectors or other elements of the system may be varied. Also, the chassis may include any number of frame members having any of a variety of configurations. Further, an operator compartment configured to receive a plurality of occupants (e.g., an operator compartment having second and/or third row seating, etc.) may be provided. In such a configuration, the operator compartment may be disposed completely over the engine in addition to the generator. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A hybrid vehicle comprising:

a vehicle chassis;

an operator compartment supported at a forward portion of the vehicle chassis, the operator compartment having a front end that defines an opening;

a drive system comprising the combination of an engine coupled inline with a generator, the drive system being positioned substantially under the operator compartment, the generator being positioned in front of the engine relative to the vehicle chassis and coupled to at least one electric drive motor powering a wheel of the vehicle; and a control panel housing a circuit protection system coupled to the generator, the control panel being coupled to the generator at an end opposite the engine, the control panel being accessible to a user through the opening in the operator compartment.

2. The vehicle of claim 1, wherein the chassis comprises a first frame member extending substantially parallel and spaced apart with a second frame member to provide a cavity.

3. The vehicle of claim 2, wherein the drive system is supported in the cavity.

4. The vehicle of claim 3, wherein the cavity constitutes the centerline of the vehicle.

5. The vehicle of claim 2, wherein the chassis further comprises a first extension member extending from a front end of the first frame member and second extension member extending from a front end of the second frame member.

6. The vehicle of claim 5, wherein the height of the first and second extension members is less than the height of the first and second frame members.

7. The vehicle of claim 6, wherein the height of the first and second extension members enables the operator compartment to have an increased volume.

8. The vehicle of claim 1, wherein the operator compartment includes an area configured to receive a human operator.

9. The vehicle of claim 8, wherein the engine is positioned substantially rearwardly of the area of the operator compartment configured to receive a human operator.

10. The vehicle of claim 9, wherein the area configured to receive a human operator is approximately defined as an area forward of a plane formed by a seat back of an operator.

11. The vehicle of claim 1, wherein the drive system further comprises a cooling system positioned substantially behind the operator compartment.

12. The vehicle of claim 1, wherein an electrical bus assembly electrically links the generator and the drive motor.

13. The vehicle of claim 12, wherein the electrical bus is an AC electrical bus assembly.

14. The vehicle of claim 13, wherein the electric drive motor is an electric traction motor.

15. The vehicle of claim 1, wherein electrical leads exiting the generator are routed through the circuit protection system before being routed to other areas on the vehicle.

16. The vehicle of claim 15, wherein the the opening is substantially covered during normal use of the vehicle.

17. The vehicle of claim 16, further comprising a grill having at least on vent disposed over the opening for covering the opening during normal use of the vehicle.

18. The vehicle of claim 1, wherein the vehicle is a refuse vehicle for use in the collection and transportation of refuse.

19. A refuse vehicle comprising:
a chassis configured to support a refuse container;
a drive system comprising the combination of an engine coupled to a generator, and supported at a front portion of the chassis, the generator being positioned in front of the engine and coupled to at least one electric drive motor powering a wheel of the refuse vehicle;
an operator compartment at least partially supported over the drive system, the operator compartment having a front end that defines an opening; and
a control panel housing a circuit protection system coupled to the generator, the control panel being coupled to the generator at an end opposite the engine, the control panel being accessible to a user through the opening in the operator compartment.

20. The refuse vehicle of claim 19, wherein the operator compartment is substantially over the generator and forward of at least a portion of the engine.

21. The refuse vehicle of claim 19, wherein the operator compartment is movably coupled to the chassis and configured to move between a use position and a service position.

22. The refuse vehicle of claim 21, wherein the operator compartment is configured to move into the service position by tilting forward.

23. The refuse vehicle of claim 19, wherein a height of the generator in the drive system is different than a height of the engine.

24. The refuse vehicle of claim 23, wherein the height of the generator in the drive system is less than the height of the engine.

25. The refuse vehicle of claim 24, wherein the operator compartment includes a structure extending in a fore and aft direction formed around the drive system.

26. The refuse vehicle of claim 25, wherein the height of the structure disposed over the generator is lower than the height of the structure over the engine.

27. The refuse vehicle of claim 19, wherein the engine comprises a power output located at a rear portion of the engine and configured to drive a pump.

28. The refuse vehicle of claim 27, wherein the power output is configured to drive a pump used to manipulate the position of the refuse container.

29. A hybrid drive system for use in a vehicle, the system comprising:
an engine coupled inline with a generator, the combination of the engine and generator configured to be supported by a vehicle chassis at least partially under an operator compartment of the vehicle; and
a control panel housing a circuit protection system coupled directly to the generator at an end opposite the engine.

30. The system of claim 29, wherein the engine is an internal combustion engine.

31. The system of claim 29, wherein the generator is capable of providing electrical energy for the operation of at least one electric drive motor.

32. The system of claim 31, wherein the electric drive motor is an electric traction motor.

33. The system of claim 29, wherein the control panel configured to be accessible to a user through an opening defined by a front end of the operator compartment.

34. The system of claim 33, wherein electrical leads exiting the generator are configured to be routed through the circuit protection system before being routed to other areas on the vehicle.

35. The system of claim 29, further comprising a cooling package capable of cooling at least one of the generator and the engine.

36. The system of claim 35, wherein the cooling package is configured to be supported behind the operator compartment of the vehicle.

37. The system of claim 29, wherein the engine further comprises a power output located near a rear portion of the engine and configured to drive a pump.

38. The system of claim 37, wherein the power output is configured to drive a pump used to manipulate the position of a refuse container.

39. A method of manufacturing a hybrid vehicle, the method comprising:
providing a chassis configured to movably support a plurality of wheels;
providing a drive system comprising an engine coupled to a generator;
coupling the drive system to the chassis at an orientation that positions the generator in front of the engine;
supporting an operator compartment at a forward position along the chassis, wherein the operator compartment is substantially disposed over the generator, the operator compartment having a front end that defines an opening; and coupling a control panel housing a circuit protection system to the generator, the control panel being coupled directly to the generator at an end opposite the engine, the control panel being accessible to a user through the opening in the operator compartment; and coupling the generator to at least one electric drive motor powering a wheel of the vehicle.

40. The method of claim 39, further comprising the step of providing an electrical bus between the generator and the electric drive motor.

* * * * *